US011857105B2

(12) United States Patent
Jeong

(10) Patent No.: US 11,857,105 B2
(45) Date of Patent: Jan. 2, 2024

(54) DRIP COFFEE MACHINE AND LIQUID DISCHARGE DEVICE USED THEREFOR

(71) Applicant: HANTER TECHNOLOGY CO., LTD., Anyang-si (KR)

(72) Inventor: Chan Mok Jeong, Anyang-si (KR)

(73) Assignee: Hanter Technology Co., Ltd., Gyeonggi-do (KR)

(*) Notice: Subject to any disclaimer, the term of this patent is extended or adjusted under 35 U.S.C. 154(b) by 421 days.

(21) Appl. No.: 17/092,647

(22) Filed: Nov. 9, 2020

(65) Prior Publication Data

US 2021/0345819 A1 Nov. 11, 2021

(30) Foreign Application Priority Data

May 7, 2020 (KR) .................. 10-2020-0054610
Jun. 11, 2020 (KR) .................. 10-2020-0070827

(51) Int. Cl.
A47J 31/44 (2006.01)
A47J 31/10 (2006.01)

(52) U.S. Cl.
CPC ........... A47J 31/4475 (2013.01); A47J 31/10 (2013.01)

(58) Field of Classification Search
CPC ....... B05B 15/68; B05B 15/652; F16H 19/04; F16H 19/003; F16H 19/005;
(Continued)

(56) References Cited

U.S. PATENT DOCUMENTS 9,044,117 B2 * 6/2015 Daburger ............... A47J 31/461
2013/0125759 A1 * 5/2013 Lin ........................ A47J 31/44
99/281

(Continued)

FOREIGN PATENT DOCUMENTS

JP 3173367 U 2/2012
KR 10-1281648 B1 7/2013
(Continued)

OTHER PUBLICATIONS

Korean Office Action issued in corresponding Korean Patent Application No. 10-2020-0054610 dated Sep. 9, 2020.
(Continued)

Primary Examiner — Nathaniel E Wiehe
Assistant Examiner — Spencer H. Kirkwood
(74) Attorney, Agent, or Firm — Finch & Maloney PLLC

(57) ABSTRACT

Disclosed herein are a drip coffee machine and a liquid discharge device used therefor including: a liquid providing module having a discharge pipe discharging liquid to coffee beans; a rotation module having an actuator generating rotational force, a driven gear rotated by receiving the rotational force, and a base plate rotated by being connected to the driven gear, the base plate being configured to move the discharge pipe along a rotation trajectory when rotated; and a translation module including a translation drive unit having an elastic pull member elastically deflecting the discharge pipe along a translation trajectory, an adjustment cam installed to be rotatable with respect to the base plate to adjust the position of the discharge pipe elastically deflected within the translation trajectory by the elastic pull member in the one direction or the other direction opposite to the one direction and having its outer circumferential surface in contact with the discharge pipe, and an intermediate unit transmitting the rotational force generated by the actuator to the adjustment cam, wherein the discharge pipe discharges the liquid while being moved along a discharge trajectory in which the rotation trajectory and the translation trajectory are combined with each other.

8 Claims, 10 Drawing Sheets

(58) Field of Classification Search
CPC .... F16H 19/006; F16H 19/043; A47J 31/461;
A47J 31/465; A47J 31/469; A47J
31/0615; A47J 31/40; A47J 31/54; A47J
31/4475; A47J 31/24; A47J 31/057; A47J
31/4485; A47J 31/0631; A47J 31/10;
A47J 31/06; A47J 31/573; F16K 7/063
USPC .......................................................... 99/305
See application file for complete search history.

(56) References Cited

U.S. PATENT DOCUMENTS

2016/0324365 A1* 11/2016 Pan ...................... A47J 31/0631
2022/0211207 A1*  7/2022 Lin ...................... A47J 31/4403

FOREIGN PATENT DOCUMENTS

| KR | 10-1311628 B1 | 9/2013 |
| KR | 10-1719356 B1 | 3/2017 |
| KR | 10-194343 | 12/2018 |

OTHER PUBLICATIONS

Korean Office Action issued in corresponding Korean Patent Application No. 10-2020-0070827 dated Oct. 28, 2020.

* cited by examiner

DRIP COFFEE MACHINE AND LIQUID DISCHARGE DEVICE USED THEREFOR

BACKGROUND

Field

The present disclosure relates to a drip coffee machine used to automatically make drip coffee and a liquid discharge device used therefor.

Description of the Related Art

Drip coffee is made by one of the coffee extraction methods as follows: coffee beans are ground and put into a filter, and then hot water is slowly poured over the coffee beans, passes through the filter, and is dripped to extract the coffee.

In general, drip coffee is made in such a manner that a user himself/herself uses a kettle and pours hot water into a filter containing coffee beans. In recent years, a drip coffee machine has been developed to quickly extract a large amount of the drip coffee.

In a process of making the drip coffee, hot water is discharged to the coffee beans along a spiral trajectory. In order to implement the spiral trajectory in the machine, it is common to combine movement trajectories respectively passing along X and Y axes to each other.

In this case, two or more motors such as a motor for an X-axis motion (first motor) and a motor for a Y-axis motion (second motor) are used, and it may thus be complicate to supply power to the two or more motors. The reason is that one portion is moved by the first motor, and it may thus be disturbed to supply the power to the second motor which is installed in a corresponding portion thereto and moves another portion.

SUMMARY

An object of the present disclosure is to provide a drip coffee machine capable of creating a spiral liquid discharge trajectory while using only one actuator that requires external input, and a liquid discharge device used therefor.

According to an embodiment of the present disclosure, there is provided a liquid discharge device used for a drip coffee machine, including: a liquid providing module having a discharge pipe discharging liquid to coffee beans; a rotation module having an actuator generating rotational force, a driven gear rotated by receiving the rotational force, and a base plate rotated by being connected to the driven gear, the base plate being configured to move the discharge pipe along a rotation trajectory when rotated; and a translation module including a translation drive unit having an elastic pull member elastically deflecting the discharge pipe along a translation trajectory, an adjustment cam adjusting the position of the discharge pipe elastically deflected within the translation trajectory, and an intermediate unit transmitting the rotational force generated by the actuator to the adjustment cam for the adjustment cam to be rotated, wherein the discharge pipe discharges the liquid while being moved along a discharge trajectory in which the rotation trajectory and the translation trajectory are combined with each other.

According to another embodiment of the present disclosure, there is provided a drip coffee machine including: a frame having a mounting portion and a support allowing the mounting portion to be spaced apart from a bottom; a boiler providing hot water; a hot water discharge device installed on the mounting portion and discharging hot water to a filter containing coffee beans; and a controller controlling the boiler and the hot water discharge device, wherein the hot water discharge device includes: a liquid providing module having an inlet pipe receiving hot water from the boiler and a discharge pipe communicated with the inlet pipe and discharging the received hot water; a rotation module having an actuator generating rotational force, a driven gear rotated by receiving the rotational force, and a base plate rotated by being connected to the driven gear, the base plate being configured to move the discharge pipe along a rotation trajectory when rotated; and a translation module including a translation drive unit having an elastic pull member elastically deflecting the discharge pipe within a translation trajectory in one direction, an adjustment cam installed to be rotatable with respect to the base plate to adjust the position of the discharge pipe elastically deflected within the translation trajectory by the elastic pull member in the one direction or the other direction opposite to the one direction and having its outer circumferential surface in contact with the discharge pipe, and an intermediate unit transmitting the rotational force generated by the actuator to the adjustment cam for the adjustment cam to be rotated while in contact with the discharge pipe, and the controller controls the rotation module and the translation module to allow the discharge pipe to discharge hot water while being moved along a discharge trajectory in which the rotation trajectory and the translation trajectory are combined with each other.

According to another embodiment of the present disclosure, there is provided a liquid discharge device used for a drip coffee machine, including: a liquid providing module having a discharge pipe discharging liquid to coffee beans; a rotation module having an actuator generating rotational force, a main shaft rotated by receiving the rotational force, and a base plate rotated by being connected to the main shaft, the base plate being configured to move the discharge pipe along a rotation trajectory when rotated; and a translation module including a translation drive unit having an elastic pull member elastically deflecting the discharge pipe along a translation trajectory, an adjustment cam installed to be rotatable with respect to the main shaft to adjust the position of the discharge pipe elastically deflected within the translation trajectory, and an intermediate unit transmitting the rotational force generated by the actuator to the adjustment cam for the adjustment cam to be rotated, wherein the discharge pipe discharges the liquid while being moved along a discharge trajectory in which the rotation trajectory and the translation trajectory are combined with each other.

According to another embodiment of the present disclosure, there is provided a drip coffee machine including: a frame having a mounting portion and a support allowing the mounting portion to be spaced apart from a bottom; a boiler providing hot water; a hot water discharge device installed on the mounting portion and discharging hot water to a filter containing coffee beans; and a controller controlling operations of the boiler and the hot water discharge device, wherein the hot water discharge device includes: a liquid providing module having an inlet pipe receiving hot water from the boiler and a discharge pipe communicated with the inlet pipe and discharging the received hot water; a rotation module having an actuator generating rotational force, a main shaft rotated by receiving the rotational force, and a base plate rotated by being connected to the main shaft, the base plate being configured to move the discharge pipe along a rotation trajectory when rotated; and a translation module including a translation drive unit having an elastic pull member elastically deflecting the discharge pipe along a translation trajectory, an adjustment cam installed to be rotatable with respect to the main shaft to adjust the position of the discharge pipe elastically deflected within the translation trajectory, and an intermediate unit transmitting the rotational force generated by the actuator to the adjustment cam for the adjustment cam to be rotated, and the controller controls the rotation module and the translation module to allow the discharge pipe to discharge hot water received by the boiler while being moved along a discharge trajectory in which the rotation trajectory and the translation trajectory are combined with each other.

DETAILED DESCRIPTION

Figure 1:
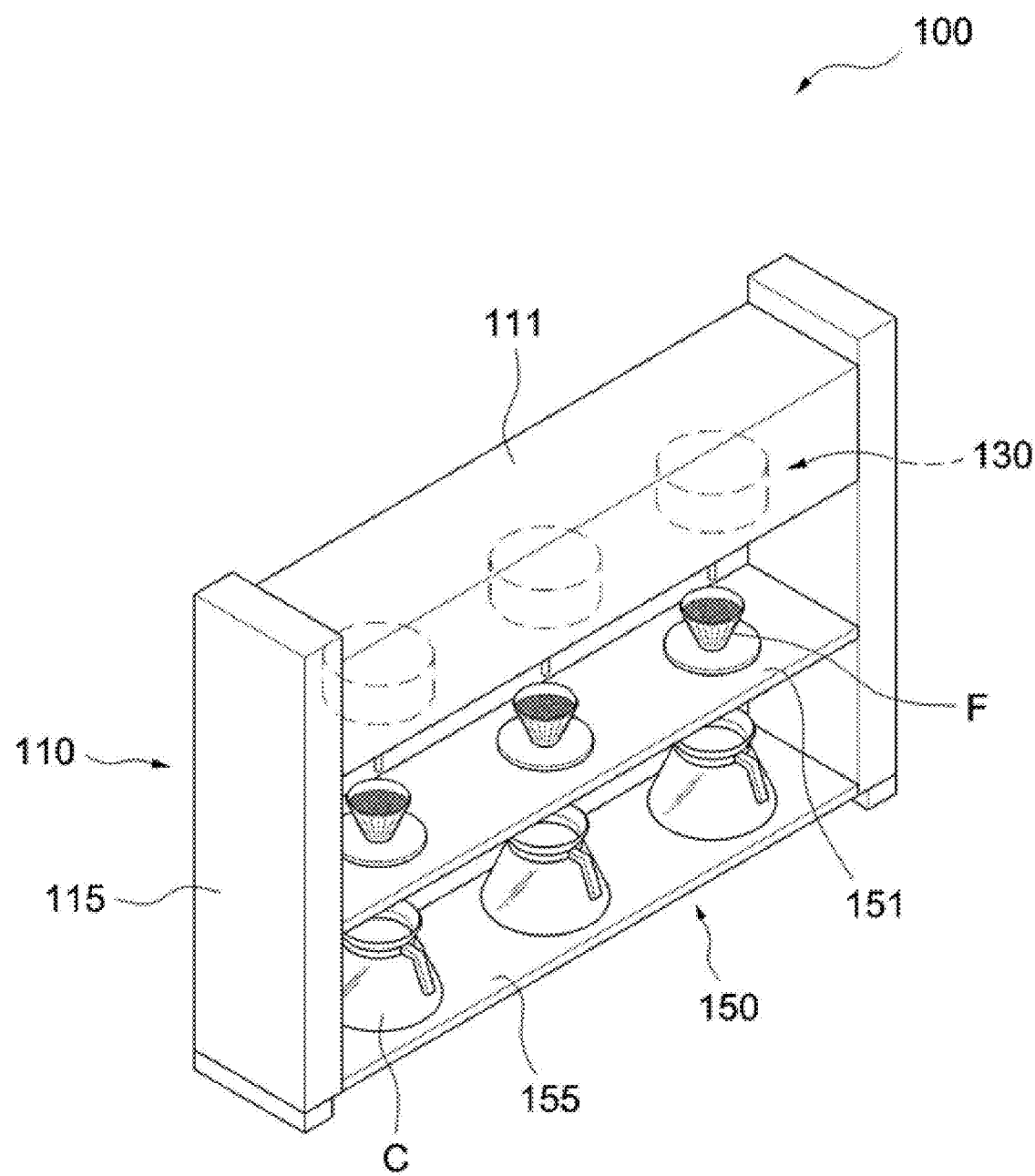
FIG. 1 is a perspective view of a drip coffee machine 100 according to an embodiment of the present disclosure.

Hereinafter, a drip coffee machine according to an embodiment of the present disclosure and a liquid discharge device used therefor are described in detail with reference to the accompanying drawings. Throughout the present disclosure, components that are the same as or similar to each other are denoted by reference numerals that are the same as or similar to each other and a description therefor is replaced by the first description, in different embodiments.

Figure 2:
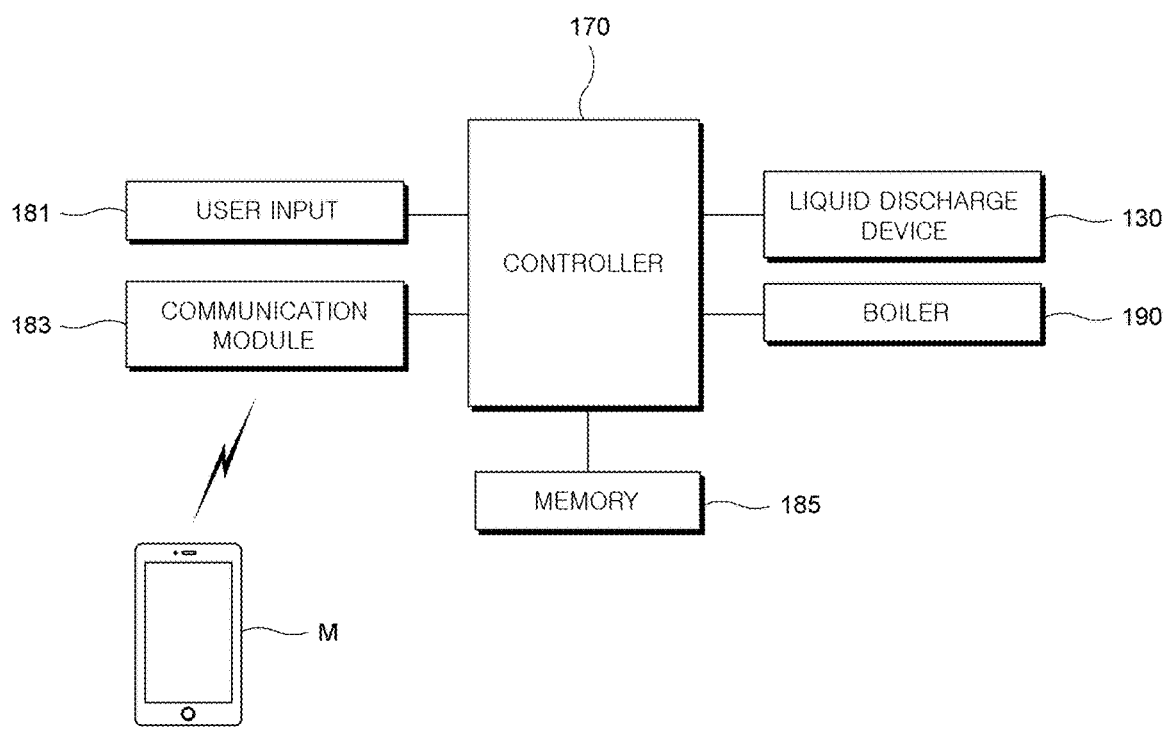
FIG. 2 is a block diagram for controlling the drip coffee machine 100 of FIG. 1.

FIG. 1 is a perspective view of a drip coffee machine 100 according to an embodiment of the present disclosure; and FIG. 2 is a block diagram for controlling the drip coffee machine 100 of FIG. 1.

Referring to the drawings, the drip coffee machine 100 may include a frame 110, a liquid discharge device 130, a support 150, a controller 170 and a boiler 190.

The frame 110 may be an overall framework, and the liquid discharge device 130 and the like may be installed therein. The frame 110 may be configured of a mounting portion 111 and a support portion 115. The support portion 115 may be configured to allow the mounting portion 111 to be spaced apart from a bottom, and may be a post disposed along the height direction. A pair of support portion 115 is shown in the embodiment, but only one support portion 115 may be provided. The mounting portion 111 and the support portion 115 may be made of a metal material, a plastic material, etc.

The liquid discharge device 130 may be built in the frame 110 and configured to discharge liquid to ground coffee beans. Here, the liquid may be water, and more specifically, hot water adjusted to have a temperature suitable for coffee extraction. A plurality of liquid discharge devices 130 may be provided to correspond to the numbers of filters F containing the ground coffee beans and containers C containing coffee extracted through each of the filters F, respectively. The plurality of liquid discharge devices 130 may be operated independently from each other.

The support 150 may be configured to support the filter F or the container C. A first support 151 which is one of the supports 150 may be provided for supporting the filter F. The container C may be supported by a second support 155. The second support 155 may be disposed below the first support 151. The first support 151 may have a through hole through which the coffee passes through the filter F. In addition, the filter F may be disposed to be inserted into the through hole. None or only one of the first support 151 and the second support 155 may be provided. If the support 150 is not provided, the drip coffee machine may be used in such a manner that the container C is disposed on the bottom and the filter F is disposed on the container C.

The controller 170 may be configured to control the liquid discharge device 130, etc. In order to operate the controller 170, a user input 181, a communication module 183, a memory 185 and the like may be additionally provided. The user input 181 may be installed in the frame 110 or the like, and may be a keypad, a touch screen, a voice recognition module or the like to receive a user's command. Unlike the user input 181, the communication module 183 may be configured to communicate with an electronic device such as the user's smartphone M or tablet, thereby receiving the user's command through the electronic device. The memory 185 may be configured to store a program for a mode in which the liquid discharge device 130 discharges the liquid based on the type or condition of the coffee beans.

The boiler 190 may be configured to make hot water which is supplied to the liquid discharge device 130. The boiler 190 may be built in the frame 110, but may be separated from the frame 110 and provided externally. If the frame 110 is disposed on a cafe table, the boiler 190 may be disposed under the table. In this case, a liquid tube connecting the boiler 190 and the liquid discharge device 130 to each other may be extended to the mounting portion 111 through the support portion 115. In an environment where the drip coffee machine 100 is used, the boiler 190 may be excluded from the configuration of the drip coffee machine 100 if there is a separate facility for supplying hot water, or cold water rather than hot water is dripped.

Based on this configuration, the user may input the type or condition of the coffee beans through the user input 181 or the smartphone M, or input an operation mode corresponding thereto. In response to this input, the controller 170 may refer to the program stored in the memory 185, thereby operating the boiler 190 and the liquid discharge device 130.

In detail, when hot water adjusted to have a predetermined temperature is provided by the boiler 190, the controller 170 may operate the liquid discharge device 130 to discharge the hot water to the filter F. In this case, the liquid discharge device 130 may discharge the hot water to the coffee beans contained in the filter F while being moved along a substantially spiral discharge trajectory.

The hot water that wets the ground coffee beans may pass through the filter F and then be dripped to the container C. Accordingly, drip coffee may be collected in the container C.

Hereinafter, the description focuses on the liquid discharge device 130 above. In the following description, the reference numeral of the liquid discharge device is changed to 200 for convenience.

Figure 3:
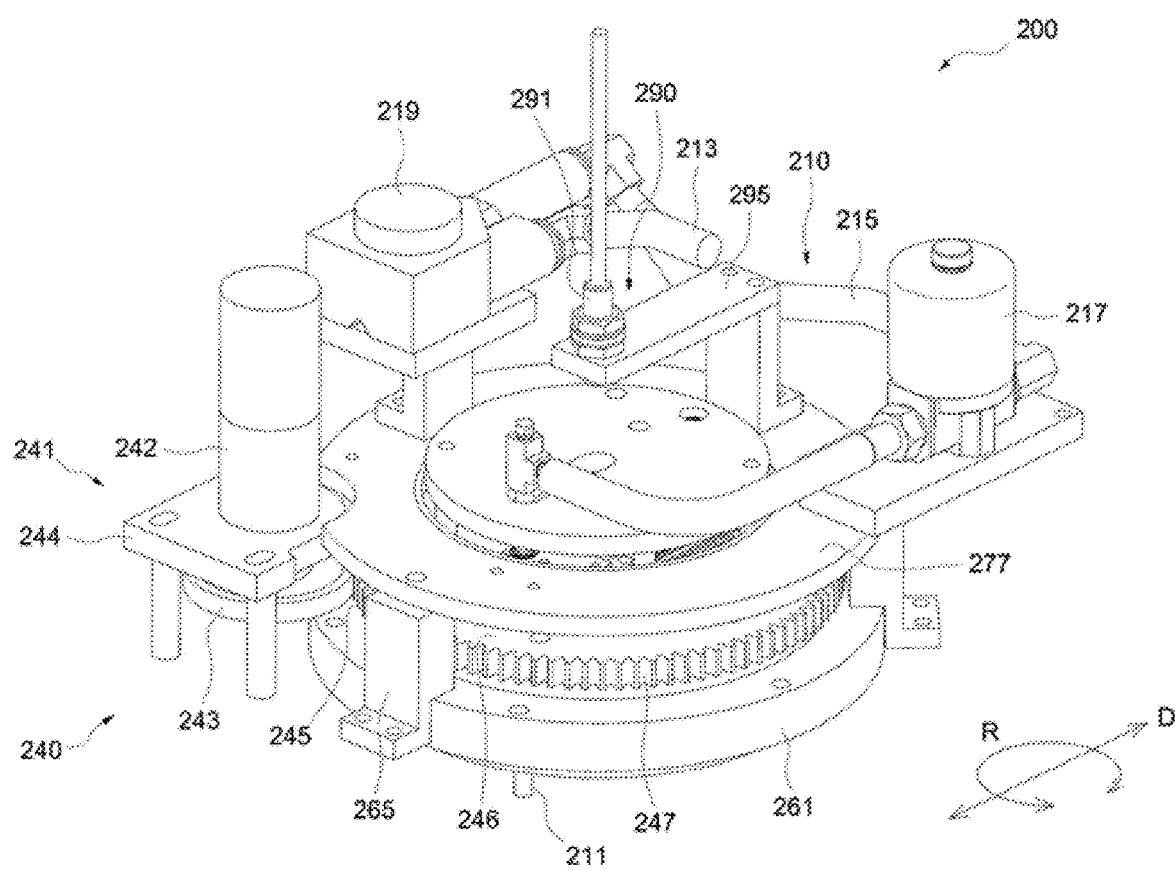
FIG. 3 is a perspective view of a liquid discharge device 200 according to an embodiment of the present disclosure when viewed in one direction.
Figure 4:
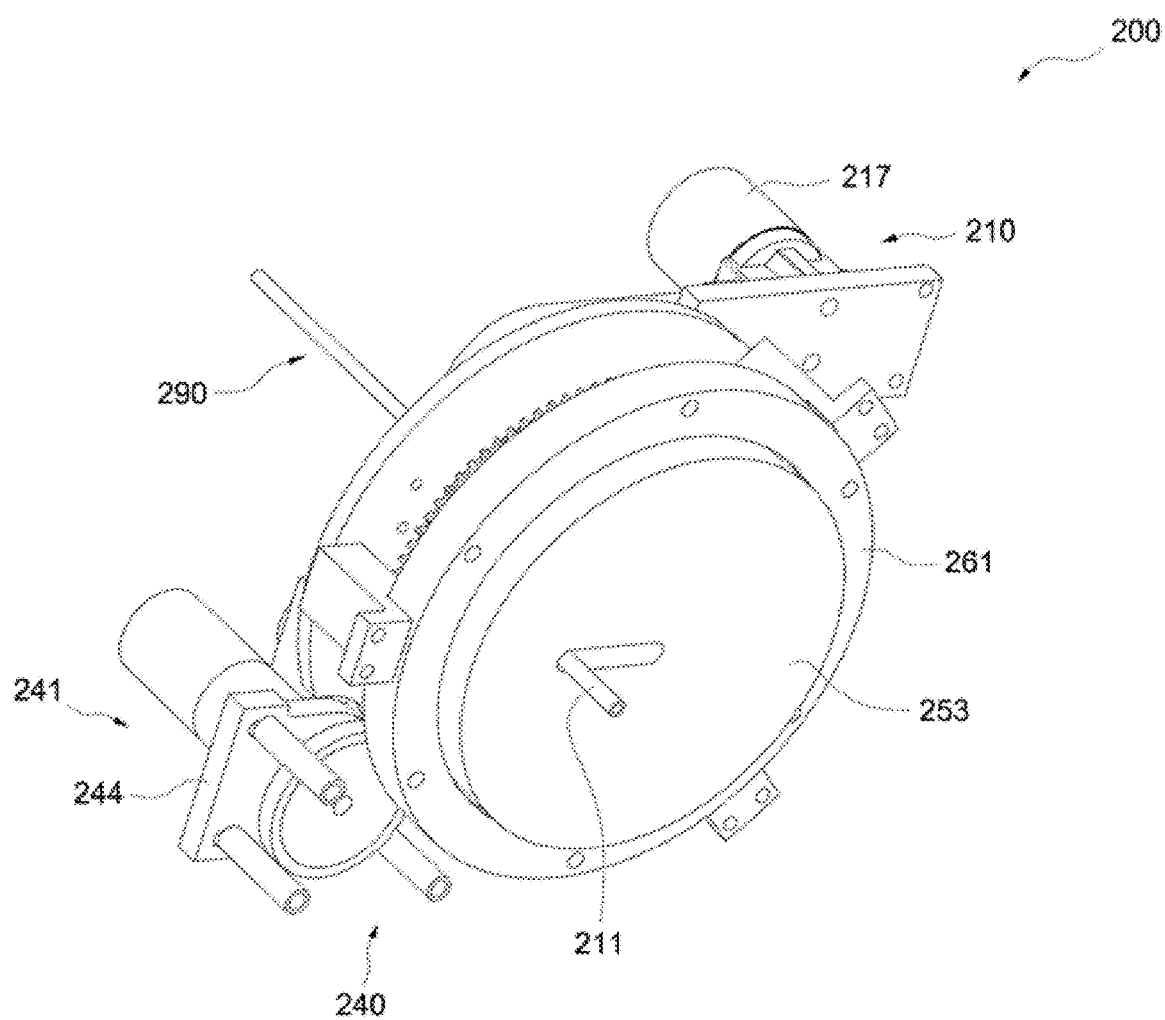
FIG. 4 is a perspective view of the liquid discharge device 200 of FIG. 3 when viewed in another direction.
Figure 5:
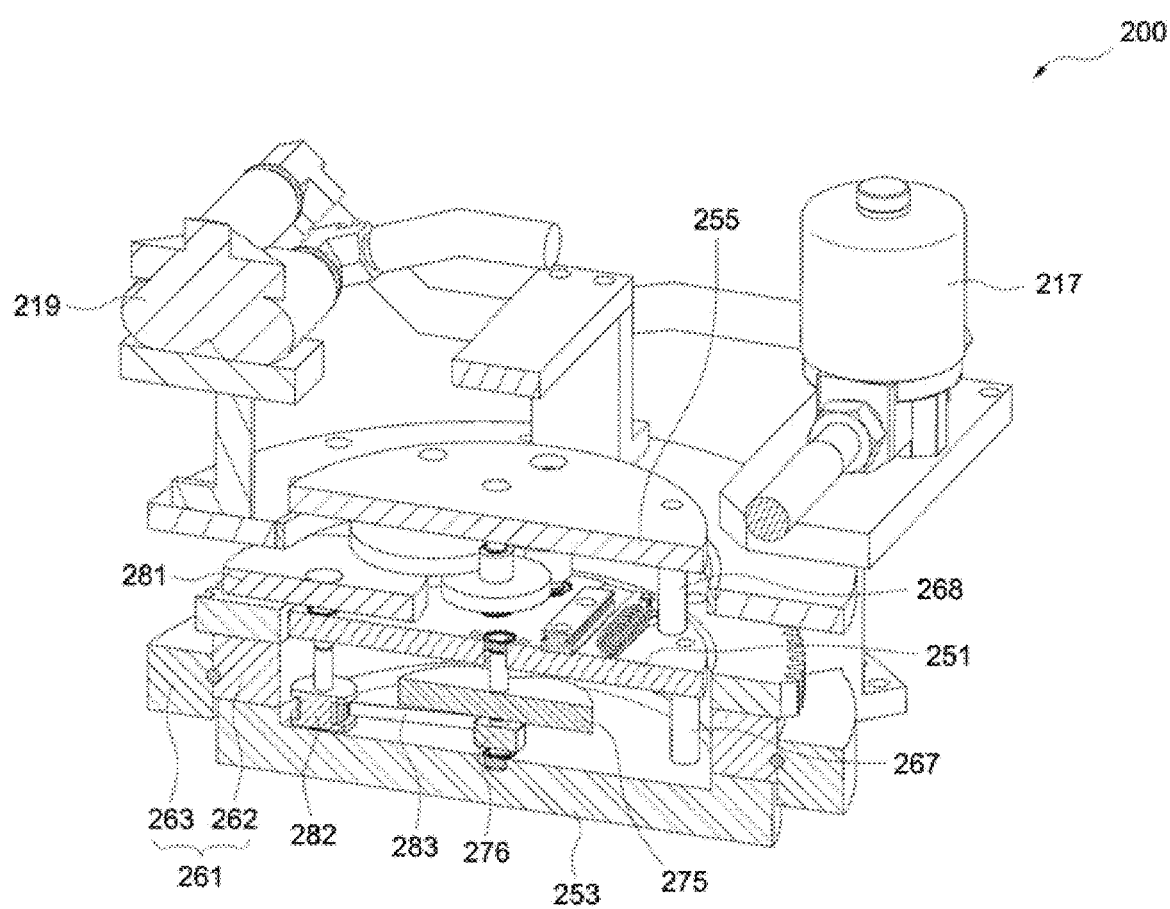
FIG. 5 is a cut perspective view of the liquid discharge device 200 of FIG. 3 when viewed in one direction.
Figure 6:
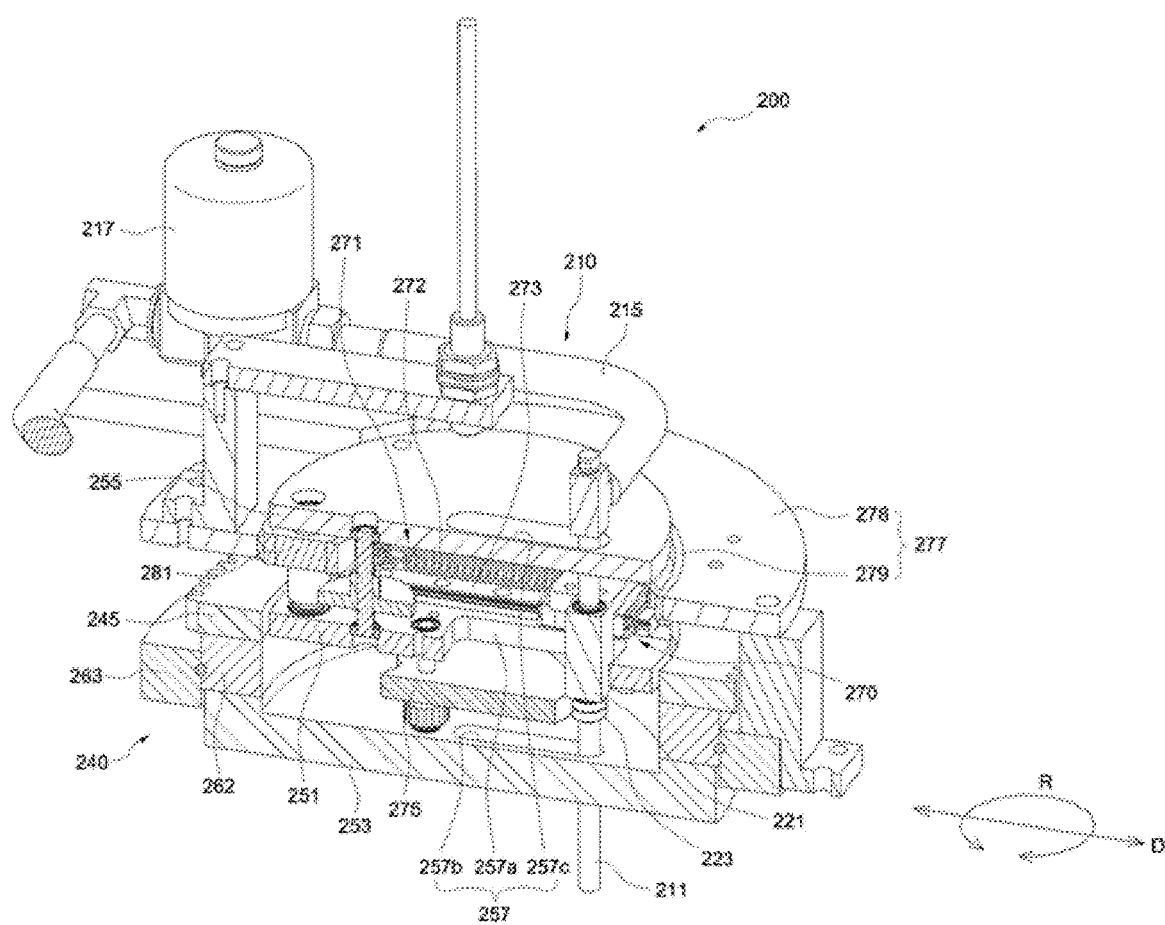
FIG. 6 is a cut perspective view of the liquid discharge device 200 of FIG. 3 when viewed in another direction.

FIG. 3 is a perspective view of a liquid discharge device 200 according to an embodiment of the present disclosure when viewed in one direction; FIG. 4 is a perspective view of the liquid discharge device 200 of FIG. 3 when viewed in another direction; FIG. 5 is a cut perspective view of the liquid discharge device 200 of FIG. 3 when viewed in one direction; and FIG. 6 is a cut perspective view of the liquid discharge device 200 of FIG. 3 when viewed in another direction.

Referring to the drawings, the liquid discharge device 200 may include a liquid providing module 210, a rotation module 240, a translation module 270 and a detection module 290.

The liquid providing module 210 may be configured to receive a liquid, specifically (hot) water from the boiler 190 (see FIG. 2) and provide the water to the coffee beans contained in the filter F (see FIG. 1). In detail, the liquid providing module 210 may have a discharge pipe 211, an inlet pipe 213, a connection pipe 215, a supply valve 217 and a flow meter 219. The discharge pipe 211 may be disposed at the end of the liquid providing module 210 and may be a portion that faces the filter F and discharges hot water thereto. The inlet pipe 213 may be disposed at the opposite end of the discharge pipe 211 and receive hot water provided by the boiler 190. The connection pipe 215 may connect the inlet pipe 213 and the discharge pipe 211 to each other to allow hot water to flow. The supply valve 217 and the flow meter 219 may each be installed to be connected to the connection pipe 215, and configured to regulate hot water or measure the flow rate of hot water. The supply valve 217 and the flow meter 219 may each be connected to the controller 170 (see FIG. 2), and operated under the control of the controller 170.

The rotation module 240 may be configured to move the discharge pipe 211 along a rotation trajectory R. The rotation module 240 may include an actuator 241, a driven gear 245, a base plate 251, a support bearing 261, etc.

The actuator 241 may be configured to generate rotational force by receiving external input. In detail, the actuator 241 may have an electric motor 242. The electric motor 242 may be operated by electrical input, and a drive gear 243 may be mounted on its output shaft. Further, the electric motor 242 may be installed on a bracket 244, and the bracket 244 may be installed in the mounting portion 111 of the frame 110 (see FIG. 1 above). Accordingly, the electric motor 242 may be fixedly installed in the frame 110.

The driven gear 245 may be configured to receive the rotational force of the electric motor 242, and may specifically be a gear engaged with the drive gear 243. The driven gear 245 may include a ring-shaped rotating body 246 and an outer circumferential thread 247 formed on an outer circumferential surface of the rotating body 246. This outer circumferential thread 247 may be engaged with a thread of the drive gear 243.

The base plate 251 may be configured to be rotated by being interlocked with the rotation of the driven gear 245 to move the discharge pipe 211 along the rotation trajectory R. The base plate 251 may be formed in a substantially circular shape and disposed to be surrounded by the driven gear 245. The base plate 251 may also be disposed at the same level as the driven gear 245 to form the same plane as the driven gear 245. Further, unlike the embodiment shown in the drawings, the driven gear 245 and the base plate 251 may be integrally formed as a single member.

Further, in addition to the base plate 251, a first auxiliary plate 253 and a second auxiliary plate 255 may be additionally provided. The first and second auxiliary plates 253 and 255 may each be disposed on a level different from that of the base plate 251. In detail, the first auxiliary plate 253 may be disposed below the base plate 251, and the second auxiliary plate 255 may be disposed above the base plate 251. The first and second auxiliary plates 253 and 255 may respectively support an adjustment cam 275 and an interlocking gear 281, which are to be described below, to be rotatable, together with the base plate 251.

A through slot 257 may be formed in each of these plates 251, 253 and 255. Through slots 257a, 257b and 257c of the through slot 257 may respectively be formed in the plates 251, 253 and 255, and formed at positions to correspond to those of the plates. The through slot 257 may have the form of a long hole made along a translation trajectory D. The discharge pipe 211 may be inserted into this through slot 257 and disposed to pass through the base plate 251, the first auxiliary plate 253 and the second auxiliary plate 255. As such, the discharge pipe 211 may be inserted into the through slot 257, and moved along the rotation trajectory R by being pushed by rotation of the base plate 251 when the base plate 251 is rotated. However, even if not inserted into the through slot 257, the discharge pipe 211 may still be pushed and moved by the rotation of the base plate 251.

The support bearing 261 may be configured to support the driven gear 245, the base plate 251 and the like to be rotatable with respect to the frame 110 (see FIG. 1). The support bearing 261 may include an inner ring 262 and an outer ring 263 that are rotatably connected with each other. The inner ring 262 may be connected to the driven gear 245 on its upper surface and to the first auxiliary plate 253 on its lower surface. The inner ring 262 may be rotated together with the driven gear 245 and the first auxiliary plate 253. On the contrary, the outer ring 263 may remain coupled and fixed to the frame 110. Here, the inner ring 262 may be disposed at a higher level than the outer ring 263, and the driven gear 245 may thus be prevented from causing friction with the outer ring 263 while being rotated.

When the driven gear 245 and the first auxiliary plate 253 are connected to each other by the support bearing 261, the first auxiliary plate 253, the base plate 251 and the second auxiliary plate 255 may be connected to one another by connecting rods 267 and 268. The connecting rods 267 and 268 may each have a shape of a rod disposed along the height direction, and the connecting rod 267 may connect the first auxiliary plate 253 to the base plate 251 and the connecting rod 268 may connect the base plate 251 to the second auxiliary plate 255.

The translation module 270 may include a translation drive unit 271, an adjustment unit 275 and an intermediate unit.

The translation drive unit 271 may be configured to move the discharge pipe 211 along the translation trajectory D without separate external input, specifically the electrical input. The translation drive unit 271 may include an elastic pull member 272 elastically deflecting the discharge pipe 211 in one direction along the translation trajectory D, for example. The elastic pull member 272 may be a coil spring having one end connected to the base plate 251 and the other end connected to a bracket 221 installed on the discharge pipe 211. The discharge pipe 211 may be moved by the elastic pull member 272 within the through slot 257, and also be guided by a guide 273. The guide 273 may be a linear motion (LM) guide for example, and disposed along the translation trajectory D at the side of the through slot 257a.

The adjustment unit 275 may be configured to adjust the position of the discharge pipe 211 deflected within the translation trajectory D in the one direction. In detail, the adjustment unit 275 may be a cam having a rotating shaft rotatably supported by the base plate 251 and the first auxiliary plate 253, respectively. The adjustment cam 275 may be disposed in such a manner that its outer circumferential surface is in contact with the discharge pipe 211, specifically a bearing 223 installed thereon. To this end, the discharge pipe 211 may be disposed in a direction crossing a plane formed by the adjustment cam 275, specifically in a direction perpendicular to the base plate 251.

The adjustment cam 275 on its own is not operated by the external input, and may be operated by the rotational force generated by the electric motor 242 for example. This operation may be made possible by the intermediate unit which transmits the rotational force to the adjustment cam 275. The intermediate unit may have a fixed gear 277 and the interlocking gear 281.

The fixed gear 277 may be disposed to be spaced apart from the top of the driven gear 245 and may be fixed regardless of the rotations of the driven gear 245 and the base plate 251. The fixed gear 277 may be configured of a fixed body 278 formed in a ring shape, and an inner circumferential thread 279 formed on its inner circumferential surface. The fixed body 278 may be supported by a mount 265, and the mount 265 may be installed in the frame 110 (see FIG. 1).

The interlocking gear 281 is a gear engaged with the fixed gear 277. In detail, the opposite ends of the rotating shaft of the interlocking gear 281 may be rotatably supported by the base plate 251 and the second auxiliary plate 255, respectively. A thread of the interlocking gear 281 may be engaged with the inner circumferential thread 279 of the fixed gear 277, and the interlocking gear 281 may thus be rotated by being engaged with the fixed gear 277 when the base plate 251 is rotated. This interlocking gear 281 may also be interlocked with the adjustment cam 275. To this end, a pulley 282 installed on the rotating shaft of the interlocking gear 281 and a pulley 276 installed on the rotating shaft of the adjustment cam 275 may be connected to each other by a belt 283.

Here, the interlocking gear 281 may include a plurality of gears instead of one gear to decelerate the rotational speed of the adjustment cam 275. In this case, the interlocking gear 281 which is a deceleration gear, may include the plurality of gears sequentially interlocked with each other and having different gear ratios.

The detection module 290 may be configured to detect whether the discharge pipe 211 is disposed at a predetermined position. To this end, the detection module 290 may have a sensor 291 disposed at the predetermined position and a mount 295 on which the sensor 291 is installed. The sensor 291 may be a distance sensor that detects a distance therefrom to the discharge pipe 211. The mount 295 may be installed on the fixed gear 277. When it is detected by the sensor 291 that the discharge pipe 211 is disposed at the predetermined position, the controller 170 (see FIG. 2) may control the rotation module 240 and the translation module 270 by using a result of this detection.

Based on this configuration, the controller 170 may open the supply valve 217 to discharge a required amount of hot water. In addition, the controller 170 may operate the electric motor 242 to generate the rotational force, and the rotational force may rotate the base plate 251, the first auxiliary plate 253 and the second auxiliary plate 255 through the drive gear 243 and the driven gear 245. As the base plate 251 is rotated, the discharge pipe 211 inserted into the through slot 257 may be moved along the rotation trajectory R by being pushed by the rotation of the base plate 251.

In addition, the elastic pull member 272 may deflect the discharge pipe 211 within the through slot 257 in the one direction by its own elastic force, regardless of the operation of the electric motor 242. In this state, the adjustment cam 275 may be rotated by the rotational force generated by the electric motor 242, thereby adjusting the discharge pipe 211 in contact with the outer circumferential surface of the adjustment cam 275 to be disposed within the translation trajectory D in the one direction or the other direction opposite to the one direction. The adjustment cam 275 may be rotated in the following manner: as the base plate 251 is rotated, the interlocking gear 281 installed thereto may be rotated by being engaged with the fixed gear 277, and the interlocking gear 281 may be interlocked with the adjustment cam 275.

Accordingly, the discharge pipe 211 may discharge hot water to the coffee beans while being moved along a discharge trajectory in which the rotation trajectory R and the translation trajectory D are combined with each other. The discharge trajectory may have a spiral shape, and may be started at the predetermined position, rotated outward, and then rotated inward again to return to the predetermined position. It may be input to the controller 170 through the sensor 291 whether the discharge pipe 211 is disposed at the predetermined position.

The controller 170 may close the supply valve 217 after the discharge pipe 211 discharges predetermined hot water through a predetermined motion. It may be detected by the flow meter 219 whether hot water at a predetermined flow rate is discharged.

A liquid discharge device of a different type from the above is described with reference to FIGS. 7 to 10.

Figure 7:
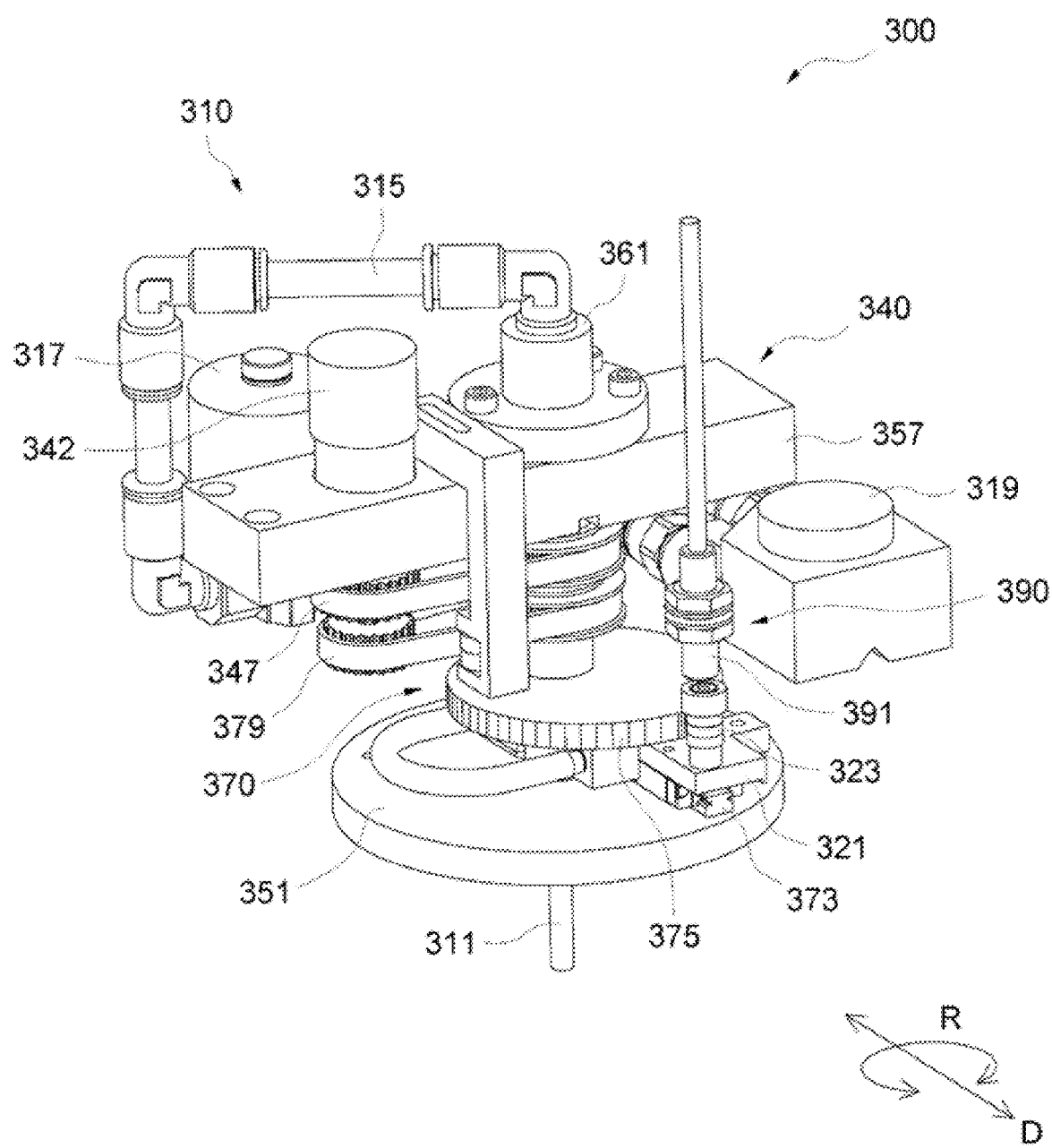
FIG. 7 is a perspective view of a liquid discharge device 300 according to another embodiment of the present disclosure when viewed in one direction.
Figure 8:
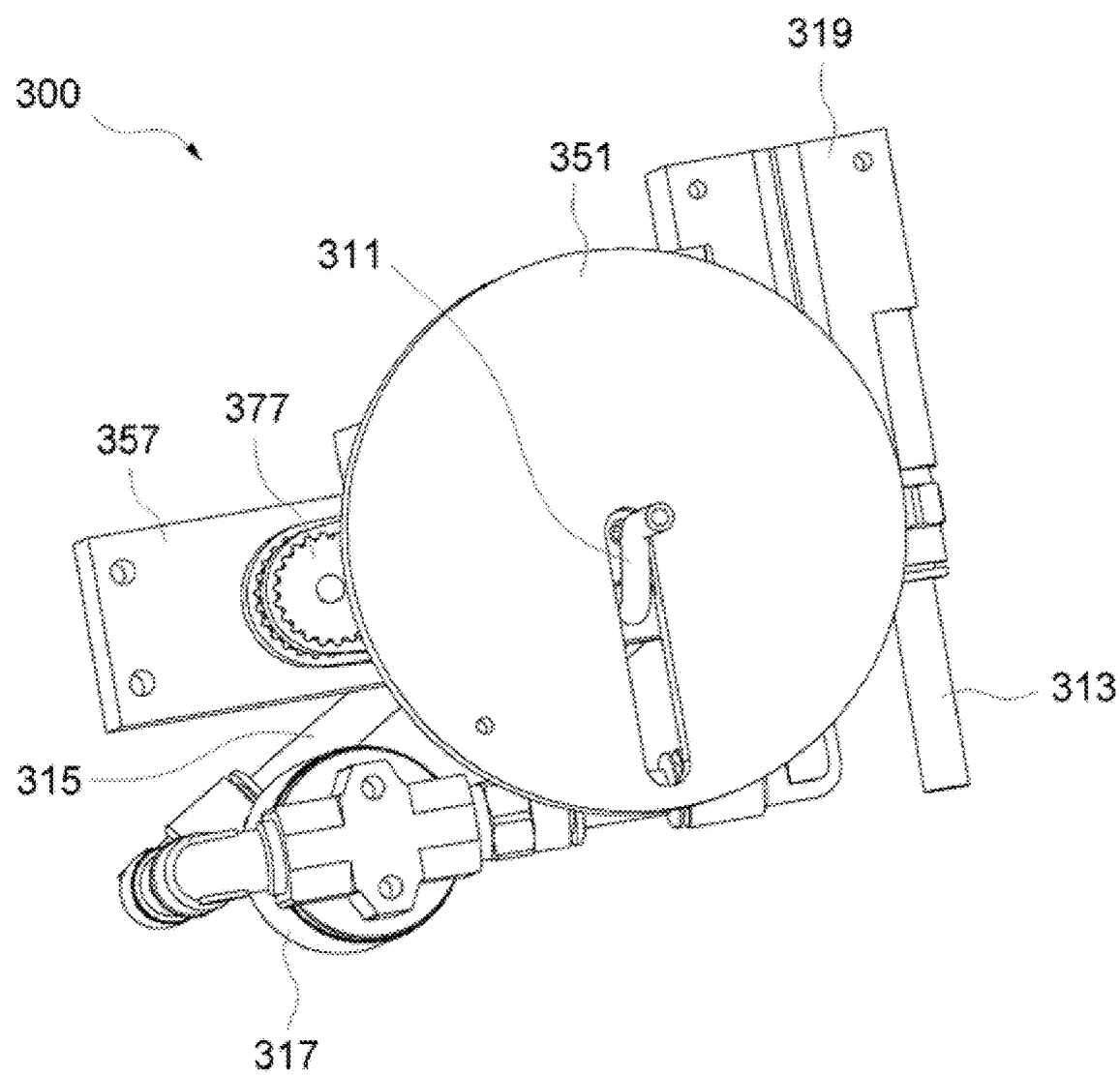
FIG. 8 is a perspective view of the liquid discharge device 300 of FIG. 7 when viewed in another direction.
Figure 9:
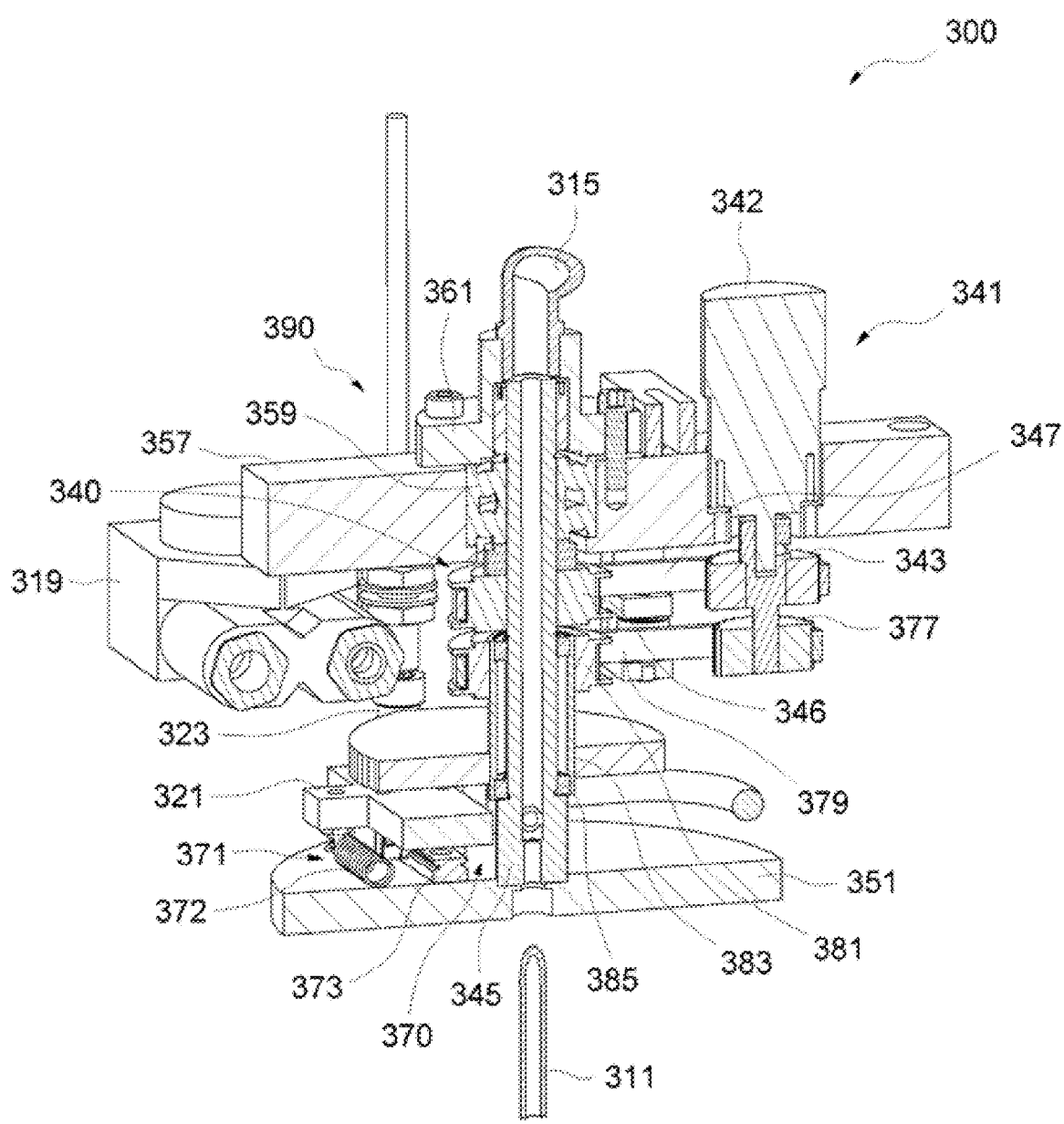
FIG. 9 is a cut perspective view of the liquid discharge device 300 of FIG. 7 when viewed in one direction.
Figure 10:
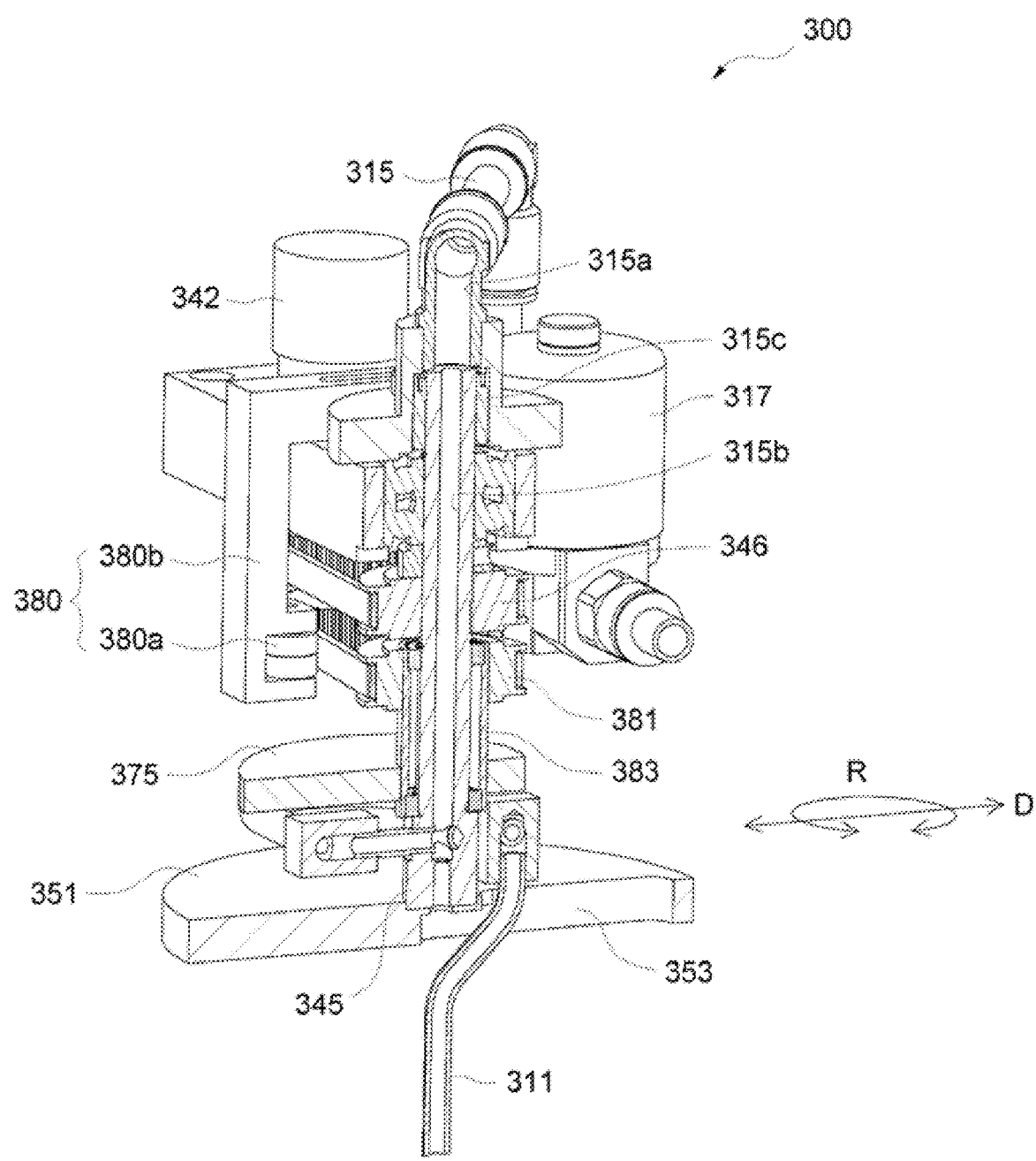
FIG. 10 is a cut perspective view of the liquid discharge device 300 of FIG. 7 when viewed in another direction.

FIG. 7 is a perspective view of a liquid discharge device 300 according to another embodiment of the present disclosure when viewed in one direction; FIG. 8 is a perspective view of the liquid discharge device 300 of FIG. 7 when viewed in another direction; FIG. 9 is a cut perspective view of the liquid discharge device 300 of FIG. 7 when viewed in one direction; and FIG. 10 is a cut perspective view of the liquid discharge device 300 of FIG. 7 when viewed in another direction.

Referring to the drawings, the liquid discharge device 300 may include a liquid providing module 310, a rotation module 340, a translation module 370 and a detection module 390.

The liquid providing module 310 may be configured to receive hot water from the boiler 190 (see FIG. 2) and discharge the water to coffee beans contained in the filter F (see FIG. 1). In detail, the liquid providing module 310 may have a discharge pipe 311, an inlet pipe 313, a connection pipe 315, a supply valve 317 and a flow meter 319. The discharge pipe 311 may be disposed at the end of the liquid providing module 310 and may be a portion that faces the filter F and discharges hot water thereto. The inlet pipe 313 may be disposed at the opposite end of the discharge pipe 311 and receive hot water provided by the boiler 190. The connection pipe 315 may connect the inlet pipe 313 and the discharge pipe 311 to each other to allow the hot water to flow. The supply valve 317 and the flow meter 319 may each be installed to be connected to the connection pipe 315, and configured to regulate hot water or measure the flow rate of hot water. The supply valve 317 and the flow meter 319 may each be connected to the controller 170 (see FIG. 2), and operated under the control of the controller 170.

The rotation module 340 may be configured to move the discharge pipe 311 along a rotation trajectory R. The rotation module 340 may include an actuator 341, a main shaft 345, a base plate 351, a mount 357, etc.

The actuator 341 may be configured to generate rotational force by receiving external input. In detail, the actuator 341 may have an electric motor 342. The electric motor 342 may be operated by electrical input, and a first drive member 343 may be mounted on its output shaft.

The main shaft 345 may be disposed substantially parallel to the output shaft of the electric motor 342 and configured to be rotated by receiving the rotational force of the electric motor 342. To this end, a first driven member 346 may be installed on the main shaft 345. The first driven member 346 may be formed as a pulley like the first drive member 343. In this case, the two members may be interlocked with each other by a first belt 347. Alternatively, the first drive member 343 and the first driven member 346 may be configured to transmit the rotational force to each other. In this case, these two members may be engaged with each other by a component other than the belt, and may be gears directly or indirectly engaged with each other for example.

The base plate 351 may be configured to be connected to and rotated together with the main shaft 345 to move the discharge pipe 311 along the rotation trajectory R. The base plate 351 may be formed as a substantially circular plate and disposed to be substantially parallel to the first driven member 346. Further, the base plate 351 may be connected to a lower portion of the main shaft 345.

A through slot 353 may be formed in the base plate 351. The through slot 353 may have the form of a long hole made along a translation trajectory D. The discharge pipe 311 may be inserted into this through slot 353 and disposed to pass through the base plate 351. As such, the discharge pipe 311 may be inserted into the through slot 353, and thus when the base plate 351 is rotated, the discharge pipe 311 may be moved along the rotation trajectory R by being pushed by the rotation of the base plate 351. However, even if not inserted into the through slot 353, the discharge pipe 311 may still be pushed and moved by the rotation of the base plate 351.

The mount 357 may be installed to allow the main shaft 345 to be rotatable. To this end, a shaft bearing 359 may be installed on the mount 357 to support the main shaft 345 to be rotatable. The shaft bearing 359 may be disposed to surround an upper portion of the main shaft 345.

The connection pipe 315 may be extended to the inside of the main shaft 345. In this case, the connection pipe 315 may be divided into a fixed portion 315a disposed outside the main shaft 345 and a rotating portion 315b disposed inside the main shaft 345. A connection cap 361 may be installed on the mount 357 for the rotating portion 315b to be rotatably connected to the fixed portion 315a. The connection cap 361 may accommodate the two portions in such a manner that the ends of the fixed portion 315a and the rotating portion 315b are in contact with each other. Further, the end of the rotating portion 315b may be surrounded by a sealing member 315c, thereby preventing liquid from leaking between the fixed portion 315a and the rotating portion 315b.

The mount 357 may be fixedly installed in the frame 110 (see FIG. 1). For example, a post (not shown) may be installed in the frame 110, and the mount 357 may be fixedly supported on the post. The electric motor 342 of the actuator 341 may also be fixedly installed on this mount 357.

The translation module 370 may include a translation drive unit 371, an adjustment unit 375 and an intermediate unit.

The translation drive unit 371 may be configured to move the discharge pipe 311 along the translation trajectory D without separate external input, specifically the electrical input. The translation drive unit 371 may have an elastic pull member 372 that elastically deflects the discharge pipe 311 along the translation trajectory D in one direction, for example. The elastic pull member 372 may be a coil spring having one end connected to the base plate 351 and the other end connected to a bracket 321 to which the discharge pipe 311 is installed. The discharge pipe 311 may be moved by the elastic pull member 372 within the through slot 353, and may also be guided by a guide 373. The guide 373 may be a linear motion (LM) guide for example, and disposed along the translation trajectory D at the side of the through slot 353.

The adjustment unit 375 may be configured to adjust the position of the discharge pipe 311 deflected within the translation trajectory D in the one direction. In detail, the adjustment unit 275 may be an adjustment cam disposed between the base plate 351 and the mount 357. The adjustment cam 375 may be installed to be rotatable with respect to the main shaft 345. In detail, a rotating cover 383 may be disposed to surround the main shaft 345. The rotating cover 383 may be supported by a cover bearing 385 to be rotatable with respect to the main shaft 345. This rotating cover 383 may be disposed to pass through the center of the adjustment cam 375, and the rotating cover 383 and the adjustment cam 375 may thus be coupled with each other.

The adjustment cam 375 may be disposed in such a manner that its outer circumferential surface is in contact with the discharge pipe 311, specifically a contact member 323 installed on the bracket 321 to which the discharge pipe 311 is connected. To this end, the contact member 323 may be disposed in a direction crossing a plane formed by the adjustment cam 375, specifically in a direction perpendicular to the base plate 351.

The adjustment cam 375 on its own is not operated by the external input, and may be operated by the rotational force generated by the electric motor 342 for example. This operation may be made possible by the intermediate unit which transmits the rotational force to the adjustment cam 375. The intermediate unit may have a second drive member 377 and a second driven member 381 in addition to the rotating cover 383 and the cover bearing 385, which are described above.

The second drive member 377 may be installed on the output shaft of the electric motor 342 and may receive the same rotational force as the first drive member 343.

The second driven member 381 may be interlocked with the second drive member 377 and installed on the rotating cover 383. The second driven member 381 may be formed as a pulley like the second drive member 377. In this case, the two members may be interlocked with each other by a second belt 379. Further, the second drive member 377 may have a smaller diameter than the first drive member 343. Accordingly, the second belt 379 may have insufficient tension compared to the first belt 347, which may be adjusted by a tension adjustment unit 380. The tension adjustment unit 380 may have an adjustment roller 380a in contact with the second belt 379. The adjustment roller 380a may be rotatably mounted on the bracket 380b installed on the mount 357.

The detection module 390 may be configured to detect whether the discharge pipe 311, specifically, the contact member 323 connected thereto through the bracket 321, is disposed at a predetermined position. To this end, the detection module 390 may have a sensor 391 disposed at the predetermined position and a bracket (not shown) on which the sensor 391 is installed. The sensor 391 may be a distance sensor that detects a distance therefrom to the contact member 323. The bracket (not shown) may be installed in the frame 110 (see FIG. 1). When it is detected by the sensor 391 that the discharge pipe 311 is disposed at the predetermined position, the controller 170 (see FIG. 2) may control the rotation module 340 and the translation module 370 by using a result of this detection.

Based on this configuration, the controller 170 may open the supply valve 317 to discharge a required amount of hot water. In addition, the controller 170 may operate the electric motor 342 to generate the rotational force, and the rotational force may rotate the base plate 351 through the first drive member 343 and the first driven member 346 and also through the main shaft 345. As the base plate 351 is rotated, the discharge pipe 311 inserted into the through slot 353 may be moved along the rotation trajectory R by being pushed by the rotation of the base plate 351.

In addition, the elastic pull member 372 may deflect the discharge pipe 311 to be disposed at the predetermined position within the through slot 353 by its own elastic force, regardless of the operation of the electric motor 342. In this state, the adjustment cam 375 may be rotated by the rotational force generated by the electric motor 342, thereby adjusting the discharge pipe 311 to be disposed within the translation trajectory D. The adjustment cam 375 may be rotated in the following manner: as the electric motor 342 is rotated, the second drive member 377 coupled to its output shaft may rotate the second driven member 381, and the second driven member 381 may then be interlocked with the adjustment cam 375 through the rotating cover 383.

Accordingly, the discharge pipe 311 may discharge hot water to the coffee beans while being moved along a discharge trajectory in which the rotation trajectory R and the translation trajectory D are combined with each other. The discharge trajectory may have a spiral shape, and may be started at the predetermined position, rotated outward, and then rotated inward again to return to the predetermined position. It may be input to the controller 170 (see FIG. 2) through the sensor 391 whether the discharge pipe 311 is disposed at the predetermined position.

The controller 170 may close the supply valve 317 after the discharge pipe 311 discharges predetermined hot water through a predetermined motion. It may be detected by the flow meter 319 whether hot water at a predetermined flow rate is discharged.

In the drip coffee machine according to the present disclosure configured as above and the liquid discharge device used therefor, the discharge pipe of the liquid providing module may be moved along the rotation trajectory by the rotation module, moved along the translation trajectory by the translation module, and finally moved along the discharge trajectory in which the rotation trajectory and the translation trajectory are combined with each other to discharge the liquid. Here, the actuator that generates the rotational force in the rotation module may rotate the base plate through the driven gear, and the translation module may have the adjustment cam and the intermediate unit that allow the position of the discharge pipe within the translation trajectory to be adjusted by the rotational force above in addition to the translation drive unit that elastically deflects the discharge pipe, thereby making the actuator to be a sole drive source that requires the external input.

In addition, in another embodiment, the discharge pipe of the liquid providing module may be moved along the rotation trajectory by the rotation module, moved along the translation trajectory by the translation module, and finally moved along the discharge trajectory in which the rotation trajectory and the translation trajectory are combined with each other to discharge the liquid. Here, the actuator that generates the rotational force in the rotation module may rotate the main shaft and the base plate connected thereto, and the translation module may have the adjustment cam and the intermediate unit that allow the position of the discharge pipe within the translation trajectory to be adjusted by the rotational force above in addition to the translation drive unit that elastically deflects the discharge pipe, thereby making the actuator to be a sole drive source that requires the external input.

Further, the pulley and the belt may be used as components for transmitting the rotational force of the actuator to the main shaft or the adjustment cam. In this case, noise generated by their operations may be minimized.

The drip coffee machine as described above and the liquid discharge device used therefor may not be limited to the configuration and operation of the embodiments described above. The above described embodiments may be configured so that various modifications may be made by selective combinations of all or some of the respective embodiments.

What is claimed is:

1. A liquid discharge device used for a drip coffee machine, comprising:
   a liquid providing module having a discharge pipe;
   a rotation module having an actuator, the actuator configured for generating a rotational force,
   a driven gear configured to be rotated by receiving the rotational force, and
   a base plate rotatable via connection to the driven gear, the base plate being configured to move the discharge pipe along a rotation trajectory when the base plate is in rotation; and
   a translation module including a translation drive unit, the translation drive unit having an elastic pull member, the elastic pull member configured to elastically deflect the discharge pipe along a translation trajectory in one direction and an other direction that is opposite said one direction,
   an adjustment cam having an outer circumferential surface in contact with the discharge pipe, the adjustment cam configured to be rotated with respect to the base plate for adjusting the position of the discharge pipe along the translation trajectory, and
   an intermediate unit configured to transmit the rotational force to the adjustment cam resulting in the adjustment cam being rotated so that the discharge pipe discharges liquid from the liquid providing module to coffee beans while being moved along a discharge trajectory, the discharge trajectory being a combination of the rotation trajectory and the translation trajectory.

2. The liquid discharge device used for a drip coffee machine of claim 1, wherein the actuator includes:
   an electric motor; and
   a drive gear that is installed on an output shaft of the electric motor and engaged with the driven gear,
   the driven gear including: a ring-shaped rotating body that surrounds the base plate; and an outer circumferential thread is formed on an outer circumferential surface of the ring-shaped rotating body.

3. The liquid discharge device used for a drip coffee machine of claim 1, wherein the rotation module further includes a through slot, and the discharge pipe is inserted into the through slot, the discharge pipe being biased along the rotation trajectory plate when the base plate rotates.

4. The liquid discharge device used for a drip coffee machine of claim 1, wherein the intermediate unit includes:
 a fixed gear being fixed in position and the base plate being rotatable relative to the fixed gear; and
 an interlocked gear being interlocked with the adjustment cam and engaged with the fixed gear such that the interlocked gear rotates as the base plate is rotated.

5. The liquid discharge device used for a drip coffee machine of claim 4, wherein the interlocked gear includes a plurality of deceleration gears that are sequentially engaged with each other such that a rotational speed of the adjustment cam is decelerated.

6. The liquid discharge device used for a drip coffee machine of claim 4, wherein the rotation module further includes:
 a first auxiliary plate being disposed on a level that is different from a level of the base plate and the first auxiliary plate supports the adjustment cam such that the adjustment cam is rotatable, together with the base plate; and
 a second auxiliary plate being disposed opposite to the first auxiliary plate with respect to the base plate and the second auxiliary plate supporting the interlocked gear such that the interlocked gear is rotatable, together with the base plate, and
 the discharge pipe is configured to pass through the base plate, the first auxiliary plate and the second auxiliary plate.

7. The liquid discharge device used for a drip coffee machine of claim 6, wherein the rotation module further includes:
 a support bearing that is configured to support the driven gear and the first auxiliary plate with respect to the frame; and
 connecting rods being configured to respectively connect the first auxiliary plate and the second auxiliary plate to the base plate,
 the support bearing including:
 an inner ring that is coupled with the driven gear and the first auxiliary plate, and the inner ring is configured to rotate together with the driven gear and the first auxiliary plate; and
 an outer ring that surrounds the inner ring and is fixed to the frame.

8. The liquid discharge device used for a drip coffee machine of claim 1, wherein the translation drive unit further includes a guide disposed along the translational trajectory and the translation drive unit being configured to guide the discharge pipe along the translational trajectory.

* * * * *